United States Patent
Fulkerson et al.

[15] 3,658,682
[45] Apr. 25, 1972

[54] ELECTROLYTE SUPPLY SYSTEM

[72] Inventors: Emmet Mitchell Fulkerson; James Dair Andrews; Kenneth Warner Stannard, all of Cincinnati, Ohio

[73] Assignee: General Electric Company

[22] Filed: July 1, 1968

[21] Appl. No.: 741,645

[52] U.S. Cl. ........................................................... 204/224
[51] Int. Cl. ............................................................ B23p 1/02
[58] Field of Search ............... 204/143.5, 143, 224; 137/209; 417/119

[56] References Cited

UNITED STATES PATENTS

| | | | |
|---|---|---|---|
| 3,496,088 | 2/1970 | Pfau et al. | 204/143 |
| 3,475,303 | 10/1969 | Sadler et al. | 204/143 |
| 3,409,534 | 11/1968 | Andrews et al. | 204/143 |
| 3,196,093 | 7/1965 | Williams | 204/143 |
| 2,023,148 | 12/1935 | Prentice | 417/119 |
| 3,481,350 | 12/1969 | Chamberlain | 137/209 |
| 3,508,570 | 4/1970 | Wallace et al. | 137/209 |

FOREIGN PATENTS OR APPLICATIONS 597,488  5/1960  Canada.................................204/143

Primary Examiner—Howard S. Williams
Assistant Examiner—Sidney S. Kanter
Attorney—Derek P. Lawrence, Frank L. Neuhauser, Oscar B. Waddell, Edward S. Roman and Joseph B. Forman

[57] ABSTRACT

A recycling constant pressure pumping system for use in an electrochemical machining operation, where the constant pressure of the electrolyte is maintained and regulated by air pressure.

5 Claims, 1 Drawing Figure

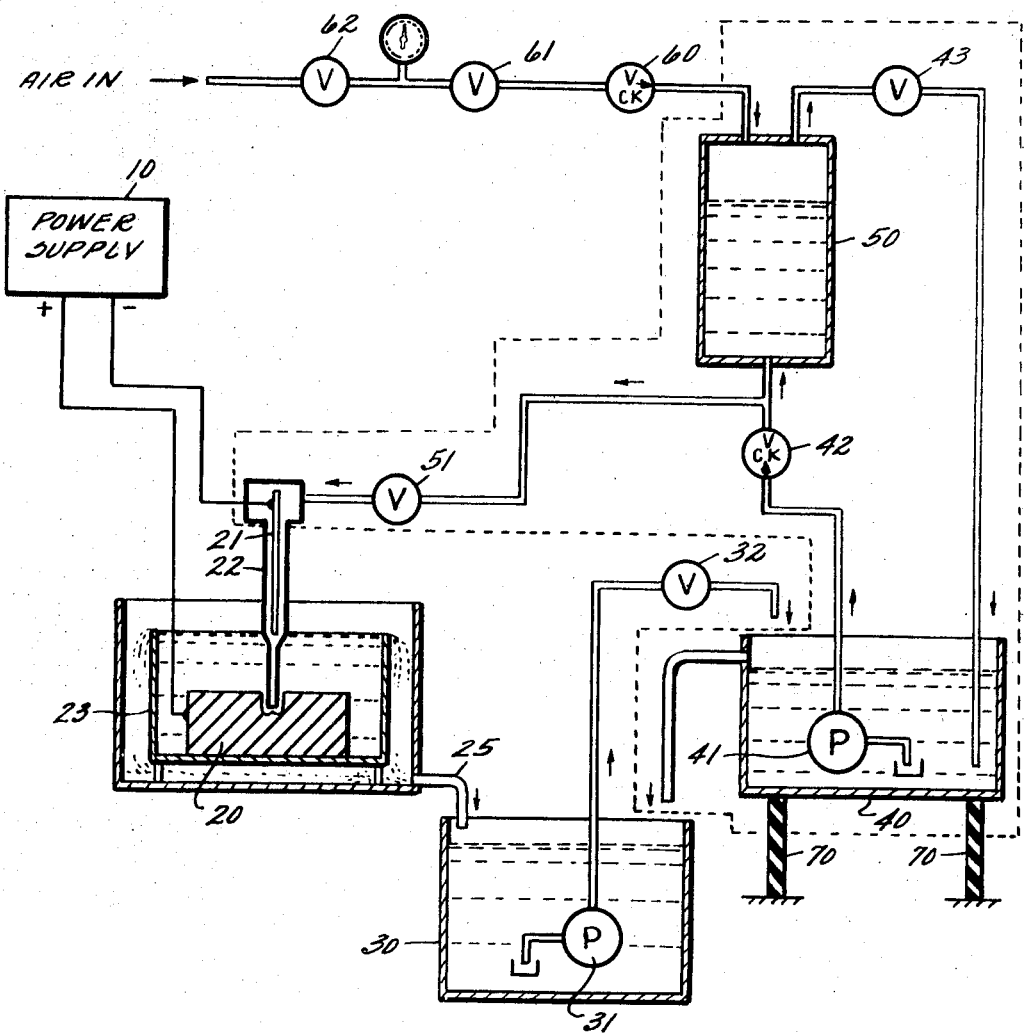

ELECTROLYTE SUPPLY SYSTEM

BACKGROUND OF THE INVENTION

1. Field of the Invention

In an electrochemical machining operation, the control of the machining process is maintained by the control of the flow of the electrolyte. In an effort to maintain a constant and regulated electrolyte flow, a static pressure system is used wherein regulated air pressure maintains an absolutely constant pressure.

2. Description of the Prior Art

In an electrochemical machining operation, a charged electrode located in a drilling nozzle electrically charges an electrolyte, said electrolyte is caused to come into contact with a charged workpiece so that a DC current flows between the workpiece and the drilling nozzle electrode by means of the flowing electrolyte. In order to more fully understand the process, your attention is directed to U. S. Pat. Application Ser. No. 474,833, filed on July 26, 1965, now U. S. Pat. No. 3,403,084. In order to maintain control over the electrochemical machining operation, the flow of the charged electrolyte, which is regulated by pressure, must be strictly controlled.

In an effort to obtain constant regulated pressure on a charged electrolyte, many systems have been used. Specifically, the prior art utilized diaphragm and piston type pumps driven by electric motors or air pistons. However, these pumps have not been free from pressure pulsations and the equipment presently available for regulating constant displacement pump pressure has not proven practical.

In order to fully understand the failure of the prior art to successfully cope with the problem, a brief look at the requirements for such a system may be helpful. Specifically, the system components which are exposed to relatively high electrical potentials (500 volts and above) must be made of non-metallic materials to prevent damage by electrolytic attack.

Furthermore, the pressure system which supplies electrolyte to the drilling means must be isolated electrically from the power circuit in order to eliminate stray leak current paths. Because of this replacement, the use of electric motor driven pumps are generally not utilized, due to the difficulty in insulating the pump from the grounded motor frame.

Previous pumping systems have failed to satisfy one or more of these requirements. As noted, electrically and pneumatically driven diaphragm and piston type pumps do not deliver the electrolyte without excessive pressure variations. The use of centrifugal pumps have proven impractical because of the pressure requirements of the system.

SUMMARY OF THE INVENTION

As a result of the deficiencies noted above, prior art pumping systems for maintaining constant flow of the electrolyte in an electrochemical machining apparatus have not been capable or effective and efficient operations. The present invention obviates many of the prior art deficiencies and is capable of effectively controlling the flow of the electrolyte.

In the preferred embodiment disclosed herein, the invention relates to an improved method for feeding the electrolyte at a constant pressure through a drilling nozzle during the electrochemical drilling of small holes in various metal alloys. As previously noted, the size of the hole drilled is directly related to the electrolyte flow rate in the working gap. Thus, maintaining absolutely constant pressure is of utmost importance in holding constant electrolytic flow.

Briefly stated, in carrying out the invention the system utilizes static pressure in which regulated air pressure is used to force electrolyte through the drilling holes. Said system is made entirely of non-corrosive and electrically non-conductive material. Specifically, the system utilizes a plurality of control means to transfer the electrolyte from an electrically non-insulated position to an electrically insulated position. Said electrolyte being electrically insulated is contained within a pressure tank, the flow from which is constantly regulated by external air pressure means.

Accordingly, it is thus a primary object of this invention to provide an improved constant pressure pumping system to be utilized in electrochemical machining apparatus in order to insure control over the rate of flow of the electrolyte and thus control over the machining operation.

BRIEF DESCRIPTION OF THE DRAWING

The drawing is a schematic of the constant pressure electrolyte system.

DESCRIPTION OF THE PREFERRED EMBODIMENT

The system for providing a constant pressure to regulate the rate of flow of a charged electrolyte utilized in an electrochemical machining operation is shown in the drawing. A power supply 10, which may be any conventional DC power source, is shown, one terminal being connected to a workpiece 20, the other being connected to an electrode 21 located within the drilling nozzle 22. The workpiece 20 is located within a container 23 said container being electrically insulated.

A fluidic, electrically conductive electrolyte is caused to come into contact with electrode 21 of drilling nozzle 22. Said electrolyte becomes electrically charged and flows to the workpiece 20 through the drilling nozzle 22, thereby causing electric current to flow between the workpiece 20 and the electrode 21 by means of the flowing electrolyte.

As noted, the charged electrolyte, after contacting the workpiece and accumulating within container 23, flows through drain 25 into a main reservoir 30. From the main reservoir the electrolyte is pumped by means of pump 31, through valve 32 into an electrically insulated transfer tank 40. From the transfer tank 40, the electrolyte, by means of pump 41, is pumped through valve 42 into a pressure tank 50. Overflow means are provided wherein excess electrolyte pumped into pressure tank 50 is caused to flow through valve 43 and return to transfer tank 40.

Under pressure, the electrolyte flows from the pressure tank 50 through valve 51 into the nozzle 22 where it comes into contact with electrode 21. Upon passing through the drilling nozzle 21 and contacting workpiece 20, the electrolyte resumes the cycle.

In order to regulate the pressure within pressure tank 50, air under pressure is admitted to the tank by means of valve 61. The air pressure into the tank and thus the electrolyte pressure found at the drilling nozzle 22 is regulated by regulator 62.

In the operation of the system and before the drilling cycle is started, valve 42 is opened and valves 60 and 51 are closed and pressure tank 50 is filled to capacity by pump 41.

Overflow, if any, of the electrolyte from the pressure tank 50 returns to transfer tank 40 by means of overflow valve 43. As noted above, during the filling operations, check valve 60 is closed in order to prevent the electrolyte from entering the air line. Valve 32 is opened allowing pump 31 to keep the transfer tank 40 in a full condition.

At the start of the drilling cycle, valve 43 is closed and valve 61 opens to permit pressurizing air into pressure tank 50. Valve 51 is caused to open and the electrolyte in pressure tank 50 flows under pressure into the drilling nozzle 22.

During the drilling operation, upon application of the voltage from power supply 10, that portion of the system shown within dotted lines is at the same electric potential as the charged electrolyte and thus must be electrically isolated from the other parts of the system. As noted, transfer tank 40, which is mounted in insulating support 70, performs this function.

From the foregoing, it will be seen that the improved arrangement of this invention is highly efficient in maintaining a constant pressure on the electrolyte, thereby assuring complete control over the electrochemical operation.

While preferred embodiments of the invention have been illustrated and described above, it will be understood that various changes and modifications may be made without departing from the spirit and scope of the invention, and it is intended to cover all such changes and modifications by the appended claims.

What is claimed as new and desired to be secured by Letters Patent of the United States is:

1. A controlled flow electrolyte system for electrochemically machining a workpiece comprising:
   a drilling nozzle;
   an electrode located within said nozzle and adapted for connection to one terminal of a power supply;
   means for fixturing said workpiece in drill receiving relation to said nozzle wherein said workpiece is further adapted for connection to the other terminal of said power supply;
   a pressure tank for containing an electrolyte;
   air pressure means for supplying said pressure tank and adapted for maintaining constant pressure on said electrolyte within said tank;
   means for flowing said electrolyte from said pressure tank to said nozzle;
   a first container means for collecting said electrolyte after flowing past the workpiece;
   a second electrically isolated container spaced apart from said first container means;
   means for flowing said electrolyte between said first container means and said second container wherein said flowing means is adapted to preserve structural isolation between said first container means and said second container thereby maintaining the complete electrical isolation integrity of said second container from said first container even at high electrochemical maching voltages; and
   means for flowing said electrolyte from said second container to said pressure tank.

2. Apparatus as defined in claim 1 in which the means for flowing the electrolyte from the first container means to the second container includes:
   a pump means;
   a first pipe means connected to the pump means for directing the flow of electrolyte into the second container, said pipe means being spaced apart from said second container thereby maintaining the electrical isolation of the second container at all voltages;
   a valve means placed within the pipe means for regulating the flow of electrolyte; and
   a second pipe means connected to the second container for redirecting the overflow of electrolyte from the second container back into the first container, said second pipe means being spaced apart from said first container thereby maintaining the electrical isolation of the second container at all voltages.

3. The system of claim 1 wherein said air pressure means supplies a constant pressure of substantially greater magnitude than atmospheric pressure.

4. The system of claim 1 wherein the means for flowing the electrolyte from the pressure tank to the nozzle includes:
   a pipe means for directing the flow of electrolyte from the pressure tank to the nozzle; and
   a valve means for further regulating the rate of flow of electrolyte through the pipe means.

5. The system of claim 1 wherein the means for flowing the electrolyte from the second container to the pressure tank includes:
   a pump means;
   a first pipe means connected to the pump means for directing the flow of electrolyte from the second container to the pressure tank;
   a second overflow pipe means for redirecting an overflow of electrolyte from the pressure tank to the second container; and
   an overflow valve means for regulating the rate of flow of electrolyte through the second pipe means.

* * * * *